US012012871B1

(12) United States Patent
Lee (10) Patent No.: US 12,012,871 B1
(45) Date of Patent: Jun. 18, 2024

(54) BLADE FASTENING ASSEMBLY AND GAS TURBINE INCLUDING SAME

(71) Applicant: DOOSAN ENERBILITY CO., LTD., Changwon-si (KR)

(72) Inventor: Han Min Lee, Busan (KR)

(73) Assignee: DOOSAN ENERBILITY CO., LTD., Changwon (KR)

( * ) Notice: Subject to any disclaimer, the term of this patent is extended or adjusted under 35 U.S.C. 154(b) by 0 days.

(21) Appl. No.: 18/505,130

(22) Filed: Nov. 9, 2023

(30) Foreign Application Priority Data

Jan. 31, 2023 (KR) ........................ 10-2023-0012527

(51) Int. Cl.
*F01D 5/32* (2006.01)
*F01D 5/30* (2006.01)
*F04D 29/32* (2006.01)
*F16B 23/00* (2006.01)
*F16B 35/04* (2006.01)
(Continued)

(52) U.S. Cl.
CPC ............ *F01D 5/323* (2013.01); *F01D 5/3007* (2013.01); *F01D 5/3053* (2013.01); *F01D 5/326* (2013.01); *F04D 29/322* (2013.01); *F16B 39/28* (2013.01); *F16B 39/282* (2013.01);
(Continued)

(58) Field of Classification Search
CPC .......... F01D 5/3053; F01D 5/32; F01D 5/323; F01D 5/326; F01D 5/3007; F04D 29/322; F04D 29/34; F05D 2260/36; F16B 23/00; F16B 23/0061; F16B 37/002; F16B 33/045; F16B 35/06; F16B 39/28; F16B 39/282; F16B 35/045
See application file for complete search history.

(56) References Cited

U.S. PATENT DOCUMENTS 2,949,278 A * 8/1960 Mccormick ............. F01D 5/326
416/193 A
5,713,721 A * 2/1998 Glynn ................... F04D 29/322
416/220 R
(Continued)

FOREIGN PATENT DOCUMENTS

JP 11-247616 A 9/1999
JP 2007-177775 A 7/2007
(Continued)

OTHER PUBLICATIONS

English machine translation of KR-20-2009-0002619-U, Mar. 7, 2024.*

*Primary Examiner* — Christopher Verdier
(74) *Attorney, Agent, or Firm* — Harvest IP Law, LLP (57) ABSTRACT

A blade fastening assembly and a gas turbine including the same are proposed. The blade fastening assembly includes a fastening key having a threaded hole, a rotor disk including a disk slot into which a root member is inserted, the rotor disk having a first groove with a shape corresponding to a portion of the fastening key, a first portion of a second groove adjacent to the first groove, and a pin groove connected with the first groove, a platform having a second portion of the second groove formed in communication with the first portion of the second groove and the first groove and forming a shape corresponding to a remaining portion of the fastening key in a state of being inserted into the disk slot, and a fastening pin inserted into the threaded hole and the pin groove.

20 Claims, 9 Drawing Sheets

(51) Int. Cl.
*F16B 39/28* (2006.01)
*F16B 39/282* (2006.01)

(52) U.S. Cl.
CPC .... *F05D 2220/323* (2013.01); *F05D 2240/30* (2013.01); *F16B 23/0061* (2013.01); *F16B 35/045* (2013.01)

(56) References Cited

U.S. PATENT DOCUMENTS

| | | |
|---|---|---|
| 5,720,596 A | 2/1998 | Pepperman |
| 8,215,915 B2 | 7/2012 | Souers |
| 8,956,122 B2 | 2/2015 | Helmis |
| 2022/0056806 A1* | 2/2022 | Kwak ................. F01D 5/326 |

FOREIGN PATENT DOCUMENTS

| | | | |
|---|---|---|---|
| JP | 2009-168016 A | 7/2009 | |
| JP | 6063738 B2 | 1/2017 | |
| KR | 10-0144863 B1 | 8/1998 | |
| KR | 20-2009-0002619 U * | 3/2009 | ............. F16B 35/06 |
| KR | 10-1689085 B1 | 1/2017 | |
| KR | 10-1942209 B1 | 1/2019 | |
| KR | 10-2023-0109879 A | 7/2023 | |

* cited by examiner

BLADE FASTENING ASSEMBLY AND GAS TURBINE INCLUDING SAME

CROSS REFERENCE TO RELATED APPLICATION

The present application claims priority to Korean Patent Application No. 10-2023-0012527, filed on Jan. 31, 2023, the entire contents of which are incorporated herein for all purposes by this reference.

BACKGROUND

1. Technical Field

The present disclosure relates to a blade fastening assembly, which is capable of fastening an axial position of a blade upon installation on a rotor disk and preventing the axial movement of the blade after the installation, and a gas turbine including the same.

2. Description of the Background Art

A turbine is a mechanical device that obtains a rotational force by an impulsive force or reaction force using a flow of a compressible fluid such as steam or gas. A turbine includes a steam turbine using a steam and a gas turbine using a high temperature combustion gas.

Among them, the gas turbine is mainly composed of a compressor, a combustor, and a turbine. The compressor is provided with an air inlet for introducing air, and a plurality of compressor vanes and compressor blades, which are alternately arranged in a compressor housing.

The combustor supplies fuel to the compressed air compressed in the compressor and ignites a fuel-air mixture using a burner to produce a high temperature and high pressure combustion gas.

The turbine has a plurality of turbine vanes and turbine blades disposed alternately in a turbine casing. Further, a rotor is arranged to pass through the center of the compressor, the combustor, the turbine and an exhaust chamber.

Both ends of the rotor are rotatably supported by bearings. A plurality of disks is fixed to the rotor and the respective blades are connected to the disks. A drive shaft is connected to a generator at an end of the exhaust chamber.

Since these gas turbines have no reciprocating mechanism, such as a piston found in a 4-stroke engine, and consequently have no frictional parts like a piston-cylinder, they have several advantages. These include minimal consumption of lubricating oil, a significant reduction in amplitude, which is a characteristic of a reciprocating machine, and the ability to operate at high speed.

Briefly describing the operation of the gas turbine, the compressed air compressed in the compressor is mixed with fuel and combusted to produce a high-temperature combustion gas in the combustor, which is then injected toward the turbine. The injected combustion gas passes through the turbine vanes and the turbine blades to generate a rotational force, which causes the rotor to rotate.

The foregoing is intended merely to aid in the understanding of the background of the present disclosure, and is not intended to mean that the present disclosure falls within the purview of the related art that is already known to those skilled in the art.

SUMMARY

Accordingly, the present disclosure has been made keeping in mind the above problems occurring in the related art, and an objective of the present disclosure is to provide a blade fastening assembly, which is capable of fastening an axial position of a blade upon installation on a rotor disk and preventing the axial movement of the blade after the installation, and a gas turbine including the same.

In an aspect of the present disclosure, there is provided a blade fastening assembly including: a fastening key having a threaded hole; a rotor disk including a disk slot into which a root member is inserted, the rotor disk having a first groove with a shape corresponding to a portion of the fastening key, a first portion of a second groove adjacent to the first groove, and a pin groove connected with the first groove; a platform having a second portion of the second groove formed in communication with the first portion of the second groove and the first groove and forming a shape corresponding to a remaining portion of the fastening key in a state of being inserted into the disk slot; and a fastening pin inserted into the threaded hole and the pin groove.

The fastening key may include a body part in which the threaded hole is formed, and a wing part extending from the body part toward the platform.

The body part may have a first height and the wing part may have a second height smaller than the first height.

The wing part may extend toward the platform from a side surface of the body part extending downwards the second height from an upper surface of the body part.

The wing part may be inserted through both the first portion of the second groove and the second portion of the second groove.

The fastening pin may be in a cylindrical shape.

The fastening pin may include an insertion part having an end inserted into the pin groove and a threaded part connected to the insertion part and threaded on an outer circumferential surface thereof.

The threaded part may be provided on an upper surface thereof with a fastening member into which a fastener is inserted to rotate the fastening pin.

In another aspect of the present disclosure, there is provided a gas turbine including: a compressor configured to compress air; a combustor configured to mix the compressed air from the compressor with fuel and combust a compressed air-fuel mixture; a turbine section rotated by combustion gases from the combustor to generate power; and a blade fastening assembly formed in at least one of the compressor and the turbine section to fasten an axial position of a blade and prevent the axial movement of the blade, the blade fastening assembly including: a fastening key having a threaded hole; a rotor disk including a disk slot into which a root member is inserted, the rotor disk having a first groove with a shape corresponding to a portion of the fastening key, a first portion of a second groove adjacent to the first groove, and a pin groove connected with the first groove; a platform having a second portion of the second groove formed in communication with the first portion of the second groove and the first groove and forming a shape corresponding to a remaining portion of the fastening key in a state of being inserted into the disk slot; and a fastening pin inserted into the threaded hole and the pin groove.

The fastening key may include a body part in which the threaded hole is formed, and a wing part extending from the body part toward the platform.

The body part may have a first height and the wing part may have a second height smaller than the first height.

The wing part may extend toward the platform from a side surface of the body part extending downwards the second height from an upper surface of the body part.

The wing part may be inserted through both the first portion of the second groove and the second portion of the second groove.

The fastening pin may be in a cylindrical shape.

The fastening pin may include an insertion part having an end inserted into the pin groove and a threaded part connected to the insertion part and threaded on an outer circumferential surface thereof.

The threaded part may be provided on an upper surface thereof with a fastening member into which a fastener is inserted to rotate the fastening pin.

Details of other implementations of various aspects of the present disclosure will be described in the following detailed description.

According to embodiments of the present disclosure, the installation of the blade on the rotor disk can be structurally safe and easily performed. Furthermore, after the installation, the axial movement of the blade can be prevented. Accordingly, wear caused by friction between the blades and the rotor disk can be prevented, thereby improving the durability of a gas turbine.

DETAILED DESCRIPTION

Hereinafter, exemplary embodiments of the present disclosure will be described in detail with reference to the accompanying drawings. However, it should be noted that the present disclosure is not limited thereto, and may include all of modifications, equivalents or substitutions within the spirit and scope of the present disclosure.

Terms used herein are used to merely describe specific embodiments, and are not intended to limit the present disclosure. As used herein, an element expressed as a singular form includes a plurality of elements, unless the context clearly indicates otherwise. Further, it will be understood that the term "comprising" or "including" specifies the presence of stated features, numbers, steps, operations, elements, parts, or combinations thereof, but does not preclude the presence or addition of one or more other features, numbers, steps, operations, elements, parts, or combinations thereof.

Hereinafter, preferred embodiments of the present disclosure will be described in detail with reference to the accompanying drawings. It is noted that like elements are denoted in the drawings by like reference symbols as whenever possible. Further, the detailed description of known functions and configurations that may obscure the gist of the present disclosure will be omitted. For the same reason, some of the elements in the drawings are exaggerated, omitted, or schematically illustrated.

Figure 1:
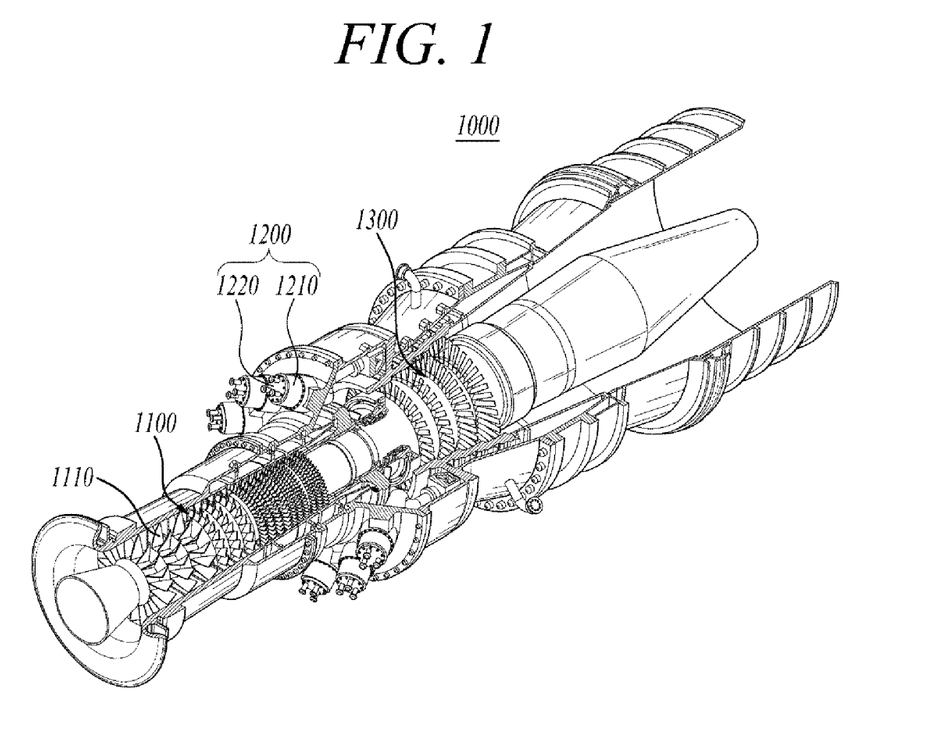
FIG. 1 is a partially cut-away perspective view of a gas turbine according to an embodiment of the present disclosure.
Figure 2:
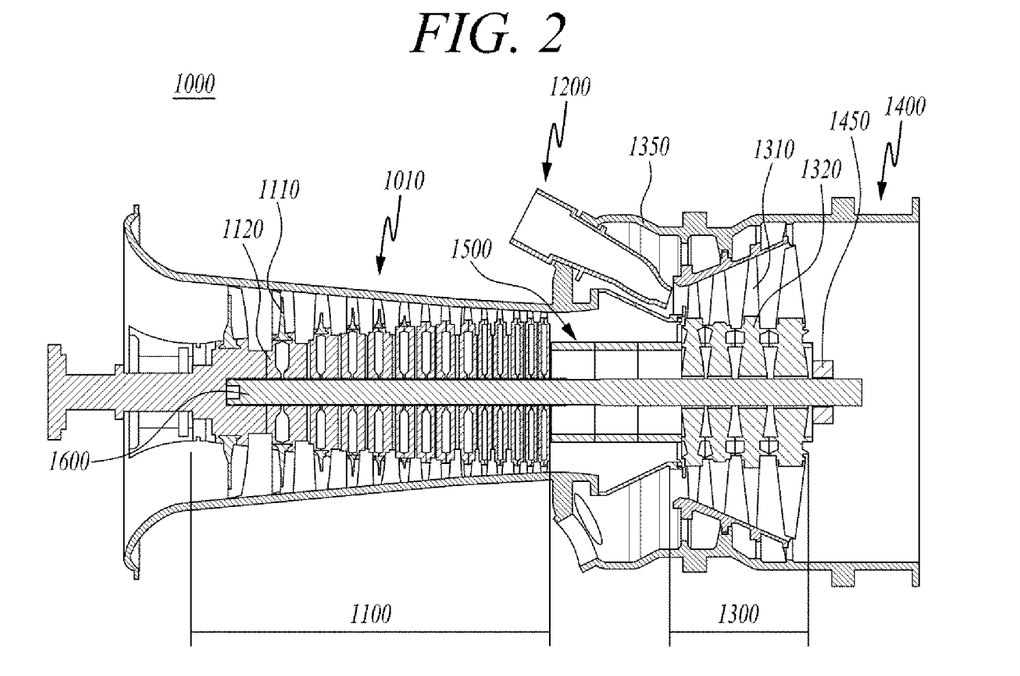
FIG. 2 is a cross-sectional view illustrating a schematic structure of a gas turbine according to an embodiment of the present disclosure.
Figure 3:
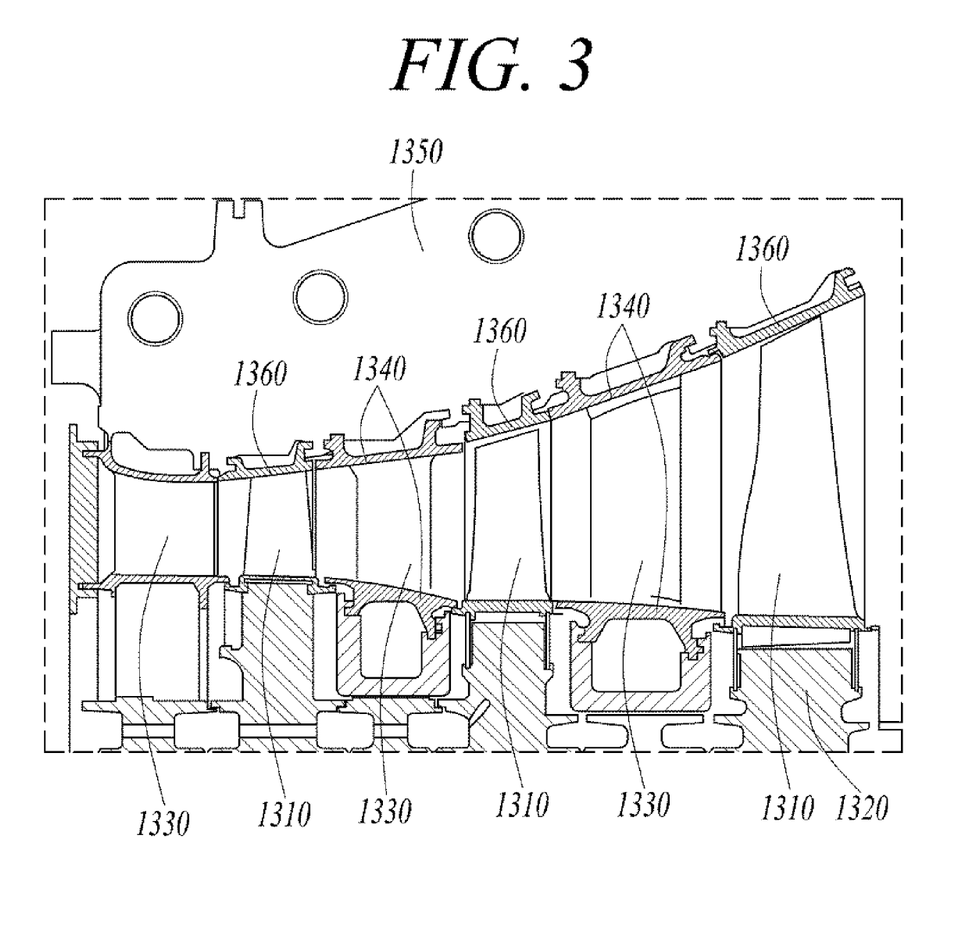
FIG. 3 is a partial cross-sectional view illustrating an internal structure of the gas turbine according to an embodiment of the present disclosure.

FIG. 1 is a partially cut-away perspective view of a gas turbine according to an embodiment of the present disclosure, FIG. 2 is a cross-sectional view illustrating a schematic structure of a gas turbine according to an embodiment of the present disclosure, and FIG. 3 is a partial cross-sectional view illustrating an internal structure of the gas turbine according to an embodiment of the present disclosure.

As illustrated in FIG. 1, a gas turbine 1000 according to an embodiment of the present disclosure includes a compressor 1100, a combustor 1200, and a turbine 1300. The compressor 1100 includes a plurality of blades 1110 radially installed. The compressor 1100 rotates the blade 1110 so that air flows while being compressed by the rotation of the blade 1110. The size and installation angle of the blade 1110 may vary depending on the installation location. In one embodiment, the compressor 1100 is connected directly or indirectly to the turbine 1300, and receives a portion of the power generated from the turbine 1300 to rotate the blade 1110.

Air compressed by the compressor 1100 flows to the combustor 1200. The combustor 1200 includes a plurality of combustion chambers 1210 and a fuel nozzle module 1220 arranged in an annular shape.

The gas turbine 1000 includes a housing 1010 and a diffuser 1400 which is disposed on a rear side of the housing 1010 and through which a combustion gas passing through a turbine is discharged. A combustor 1200 is disposed in front of the diffuser 1400 so as to receive and burn compressed air.

Referring to the flow direction of the air, a compressor 1100 is located on the upstream side of the housing 1010, and a turbine 1300 is located on the downstream side of the housing. A torque tube 1500 is disposed as a torque transmission member between the compressor 1100 and the turbine 1300 to transmit the rotational torque generated in the turbine to the compressor.

The compressor 1100 is provided with a plurality (for example, 14) of compressor rotor disks 1120, which are fastened by a tie rod 1600 to prevent axial separation thereof.

Specifically, the compressor rotor disks 1120 are axially arranged, wherein the tie rod 1600 constituting a rotary shaft passes through substantially central portion thereof. Here, the neighboring compressor rotor disks 1120 are disposed so that opposed surfaces thereof are pressed by the tie rod 1600 and the neighboring compressor rotor disks do not rotate relative to each other.

A plurality of blades 1110 are radially coupled to an outer circumferential surface of the compressor rotor disk 1120. Each of the blades 1110 is fastened to the compressor rotor disk 1120.

Vanes (not shown) fixed to the housing are respectively positioned between the rotor disks 1120. Unlike the rotor disks, the vanes are fixed to the housing and do not rotate. The vane serves to align a flow of compressed air that has passed through the blades 1110 of the compressor rotor disk 1120 and guide the air to the blades 1110 of the rotor disk 1120 located on the downstream side.

The tie rod 1600 is arranged to pass through the center of the compressor rotor disks 1120 and turbine rotor disks 1320 such that one end thereof is fastened in the compressor rotor disk located on the most upstream side and the other end thereof is fastened by a fixing nut 1450, wherein the tie rod 1600 may be composed of a single tie rod or a plurality of tie rods.

The shape of the tie rod 1600 is not limited to that shown in FIG. 2, but may have a variety of structures depending on the gas turbine. That is, as shown in the drawing, one tie rod may have a shape passing through a central portion of the rotor disk, a plurality of tie rods may be arranged in a circumferential manner, or a combination thereof may be used.

Although not shown, the compressor of the gas turbine may be provided with a vane serving as a guide element at the next position of the diffuser in order to adjust a flow angle of a pressurized fluid entering a combustor inlet to a designed flow angle. The vane is referred to as a deswirler.

The combustor 1200 mixes the introduced compressed air with fuel and combusts the air-fuel mixture to produce a high-temperature and high-temperature and high-pressure combustion gas. With an isobaric combustion process in the compressor, the temperature of the combustion gas is increased to the heat resistance limit that the combustor and the turbine components can withstand.

The combustor consists of a plurality of combustors, which is are arranged in the housing formed in a cell shape, and includes a burner having a fuel injection nozzle and the like, a combustor liner forming a combustion chamber, and a transition piece as a connection between the combustor and the turbine, thereby constituting a combustion system of a gas turbine.

Specifically, the combustor liner provides a combustion space in which the fuel injected by the fuel nozzle is mixed with the compressed air of the compressor and the fuel-air mixture is combusted. Such a liner may include a flame canister providing a combustion space in which the fuel-air mixture is combusted, and a flow sleeve forming an annular space surrounding the flame canister. A fuel nozzle is coupled to the front end of the liner, and an igniter plug is coupled to the side wall of the liner.

On the other hand, a transition piece is connected to a rear end of the liner so as to transmit the combustion gas combusted by the igniter plug to the turbine side. An outer wall of the transition piece is cooled by the compressed air supplied from the compressor so as to prevent thermal breakage due to the high temperature combustion gas.

To this end, the transition piece is provided with cooling holes through which compressed air is injected into and cools the inside of the transition piece and flows towards the liner.

The air that has cooled the transition piece flows into the annular space of the liner and compressed air is supplied as a cooling air to the outer wall of the liner from the outside of the flow sleeve through cooling holes provided in the flow sleeve so that both air flows may collide with each other.

In the meantime, the high-temperature and high-pressure combustion gas from the combustor is supplied to the turbine 1300. The high-temperature and high-pressure combustion gas expands and collides with the rotating blades of the turbine, generating a reaction force that imparts a rotational torque. This torque is subsequently transferred to the compressor via the torque tube 1500. Here, any surplus power needed to drive the compressor is used to drive a generator or similar equipment.

The turbine 1300 is basically similar in structure to the compressor. That is, the turbine 1300 is also provided with a plurality of turbine rotor disks 1320 similar to the compressor rotor disks of the compressor. Thus, the turbine rotor disk 1320 also includes a plurality of turbine blades 1310 disposed radially. The turbine blade 1310 may be coupled to the turbine rotor disk 1320 in a dovetail coupling manner, for example. Between the turbine blades 1310, a turbine vane 1330 fixed to a turbine casing 1350 is provided to guide a flow direction of the combustion gas passing through the turbine blades 1310.

The turbine vane 1330 is fixedly mounted within the turbine casing 1350 by turbine vane platform 1340 coupled to radially inner and outer ends of the turbine vane 1330. On the other hand, in a position facing the radially outer end of the rotating turbine blade 1310 on the inner side of the turbine casing 1350, a ring segment 1360 is mounted to form a predetermined gap with the radially outer end of the turbine blade 1310.

The blade 1110, 1310 may be installed on the rotor disk 1120, 1320 by T-type pin fitting, wedge insertion, caulking, or the like. The T-type pin fitting and the wedge insertion are limited in shape when installation space is tight or the disk size is small, and the caulking has a problem of causing permanent damage to the disk. Therefore, provisions that are structurally safe and have ready-to-improve installation workability have been sought in installing the blade 1110, 1310 on the rotor disk 1120, 1320.

Further, the engagement of the blades 1110, 1310 with the rotor disk 1120, 1320 is somewhat loosely performed due to assembly and tolerance. Accordingly, as a result of frequent shutdowns of a gas turbine or vibrations generated during operation of a gas turbine, the blade 1110, 1310 may move in a direction of the center tie rod 1600 (also referred to herein as an axial direction). This axial movement of the blade 1110, 1310 may cause wear due to friction between the blade 1110, 1310 and the rotor disk 1120, 1320. Therefore, there is a need for a provision to prevent the axial movement of the blade 1110, 1310.

In the following, a description will illustrate the case where a blade and a rotor disk refer to a turbine blade 1310 and a turbine rotor disk 1320, but the present disclosure may also be applied to the case where a blade and a rotor disk are a compressor blade 1110 and a compressor rotor disk 1120.

Figure 4:
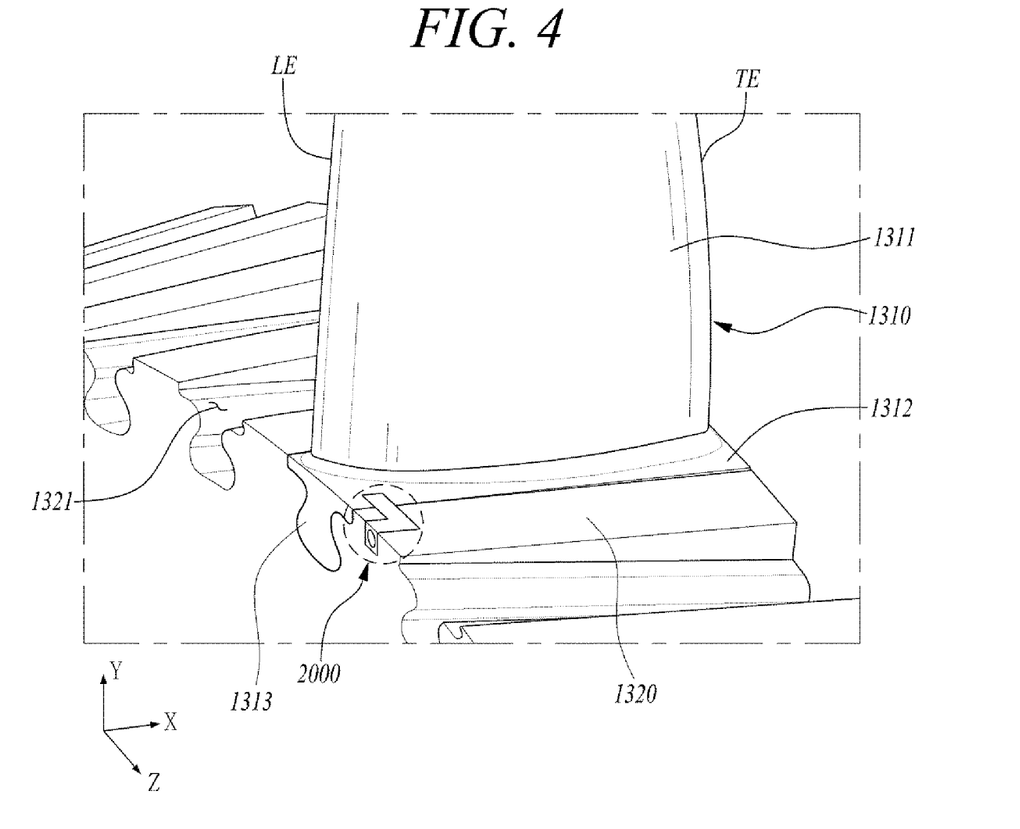
FIG. 4 is a perspective view illustrating a turbine blade and a turbine rotor disk according to an embodiment of the present disclosure.

FIG. 4 is a perspective view illustrating a turbine blade and a turbine rotor disk according to an embodiment of the present disclosure.

Referring to FIG. 4, the turbine blade 1310 includes an airfoil 1311, a platform 1312, and a root member 1313.

The airfoil 1311 is formed on an upper surface of the platform 1312. The airfoil 1311 is formed to have an optimized airfoil depending on the specifications of a gas turbine, and includes a leading edge LE disposed on an upstream side and a trailing edge TE disposed on a downstream side based on a flow direction of combustion gases.

The platform 1312 is disposed at the lower end of the airfoil 1311. The platform 1312 may be formed in a substantially rectangular plate shape. Cooling flow paths are formed inside the airfoil 1311 such that cooling air can flow therethrough via the platform 1312.

The root member 1313 is disposed on a radially inner side of the platform 1312. The radially inner side of the platform 1312 may be a lower portion of the platform 1312. The root member 1313 is formed to taper radially inwardly in width. A dovetail is formed on both circumferential sides of the root member 1313. The dovetail is fir-tree shaped in cross-section and may be formed in plurality.

The turbine rotor disk 1320 has a substantially disk shape, and a plurality of disk slots 1321 are formed on the outer circumference. The disk slots 1321 are formed to have a fir-tree shaped bending surface. The turbine blades 1310 may be fastened and installed in the disk slots 1321.

Referring to FIG. 4, the direction X is an axial direction, and the upstream side and the downstream side are defined based on the flow direction of the combustion gases along the axial direction X. The upstream end and the downstream end may be referred to as a forward end and a rearward end, respectively. The direction Y is a radial direction, along which the airfoil 1311 is extended from the platform 1312. The direction Z is a circumferential direction, along which the outer circumference of the disk-shaped turbine rotor disk 1320 is defined.

In an embodiment of the present disclosure, when the turbine blade 1310 is installed in the disk slot 1321, a blade fastening assembly 2000 is utilized to secure the axial position of the blade and prevent the axial movement of the blade once installed. The blade fastening assembly 2000 includes a first groove 2001, a second groove 2002, a pin groove 2003, a fastening key 2100, and a fastening pin 2200.

Figure 5:
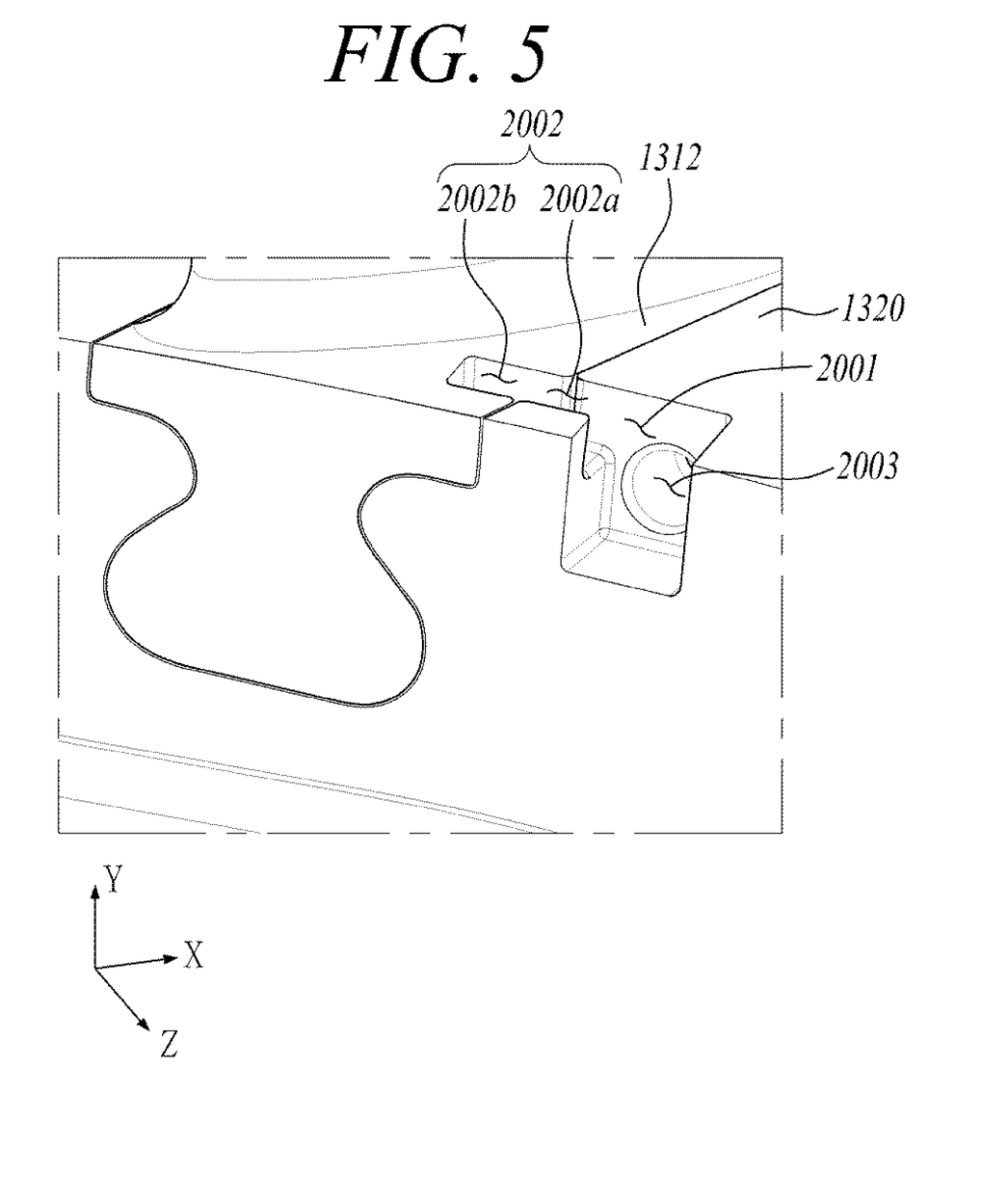
FIG. 5 is an enlarged perspective view illustrating the turbine blade being fastened to the turbine rotor disk.
Figure 6:
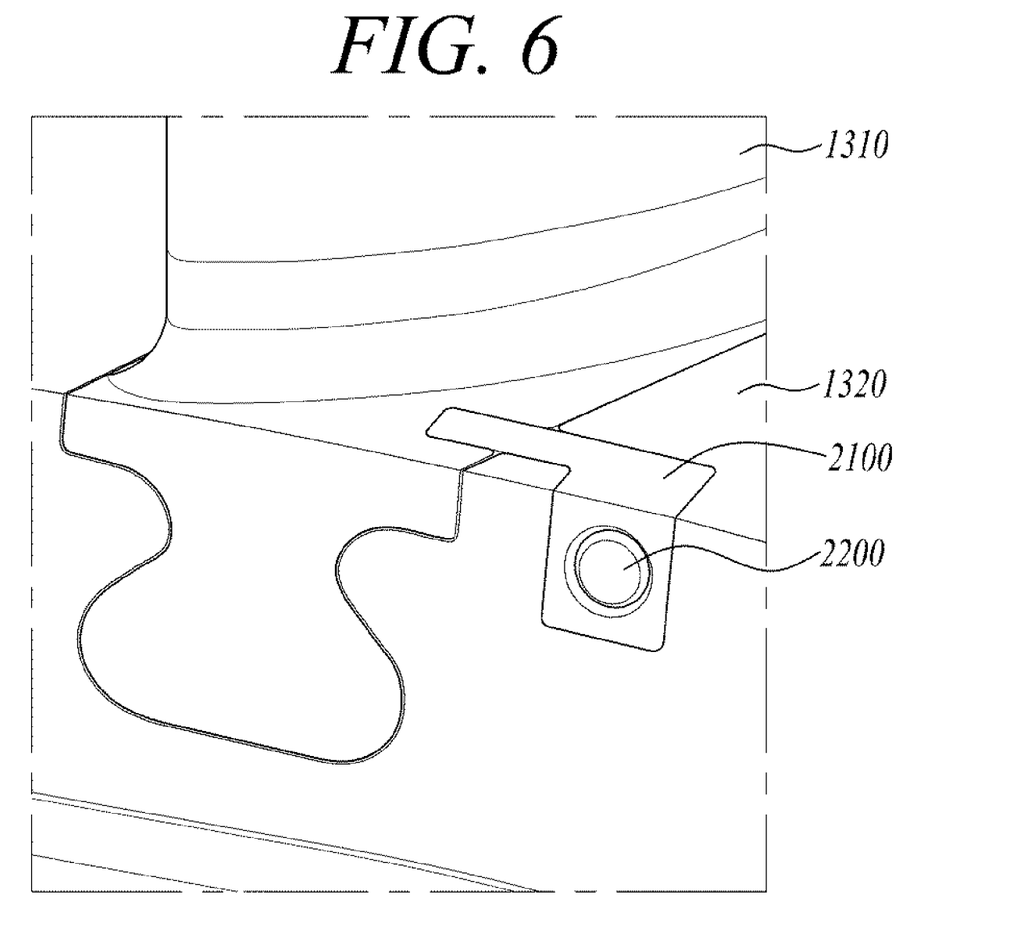
FIG. 6 is a perspective view illustrating a fastening key and a fastening pin being engaged in a state of FIG. 5.

FIG. 5 is an enlarged perspective view illustrating the turbine blade being fastened to the turbine rotor disk, and FIG. 6 is a perspective view illustrating a fastening key 2100 and a fastening pin 2200 being engaged in a state of turbine blade of FIG. 5.

Referring to FIG. 5, a first groove 2001 and a pin groove 2003 are formed in an axially forward end of the turbine rotor disk 1320, and a second groove 2002 is formed in a side of the platform 1312.

The first groove 2001 may be formed by machining or cutting a portion of the axially forward end and the upper end of the turbine rotor disk 1320. The first groove 2001 may be substantially in a cuboidal shape. The pin groove 2003 may be formed by machining or cutting the rearward end surface of the first groove 2001. The pin groove 2003 may be in a cylindrical hole shape grooved toward the rearward direction from the rearward end surface of the first groove 2001.

The second groove 2002 includes a first wing groove portion 2002a and a second wing groove portion 2002b. The second groove 2002 may be formed by machining or cutting a portion of the turbine rotor disk 1320 adjacent to the first groove 2001 (i.e., the first wing groove portion 2002a) and a side portion of the platform 1312 (i.e., the second wing groove portion 2002b). The first wing groove portion 2002a is extended from and in communication with the first groove 2001 and is formed by machining or cutting a portion of the turbine rotor disk 1320 adjacent to the first groove 2001 toward the platform 1312. The first wing groove portion 2002a is formed such that its rearward end surface is in a same axial position with the rearward end surface of the first groove 2001 and its forward end surface is located relatively further rearward compared to the forward end surface of the turbine rotor disk 1320. Also, the first wing groove portion 2002a is formed to have a smaller depth than the depth of the first groove 2001 from the upper end surface of the turbine rotor disk 1320 in the radial direction Y. The second wing groove portion 2002b is formed at the platform 1312 such that the locations of its rearward end surface, its forward end surface and its lower end surface matches the ones of the rearward end surface, the forward end surface and the lower end surface of the first wing groove portion 2002a when the turbine blade 1310 is inserted into the disk slot 1321. Thereby, the second groove 2002, which is a combined groove of the first wing groove portion 2002a and the second wing groove portion 2002b, is substantially in a cuboidal shape.

The first groove 2001 is formed in a shape matching and corresponding to a portion of the fastening key 2100 (i.e., body part 2110) described below, and the second groove 2002 is formed in a shape corresponding to the remainder of the fastening key 2100 (i.e., the wing part 2120). In other words, the first groove 2001 and the second groove 2002 are formed such that integral shape of them matches a shape of the fastening key 2100, and such that the fastening key 2100 may be matingly inserted into the combined and integral groove formed by the first groove 2001 and the second groove 2002. The first groove 2001 and the second groove 2002 are formed in communication with each other when the turbine blade 1310 is inserted into the disk slot 1321. The first groove 2001 and the second groove 2002 are connected to each other to form a shape corresponding to the shape of the fastening key 2100.

The pin groove 2003 is formed in connection with the first groove 2001. The pin groove 2003 is formed by extending axially rearwards from an inner surface (i.e., the rearward surface) of the first groove 2001. In the pin groove 2003, an end of the fastening pin 2200 described later may be inserted.

Referring to FIG. 6, the fixing key 2100 is inserted into the first groove 2001 and the second groove 2002, and the fixing pin 2200 is inserted into the pin groove 2003 through the threaded hole 2111 formed in the fixing key 2100. This allows the axial position of the turbine blade to be fixed using the fixing key 2100 and the fixing pin 2200 when the turbine blade 1310 is matingly installed in the turbine disk slot 1321. Further, after installation, the fastening key 2100 and fastening pin 2200 can prevent axial movement of the turbine blade 1310 within the turbine disk slot 1321.

Figure 7:
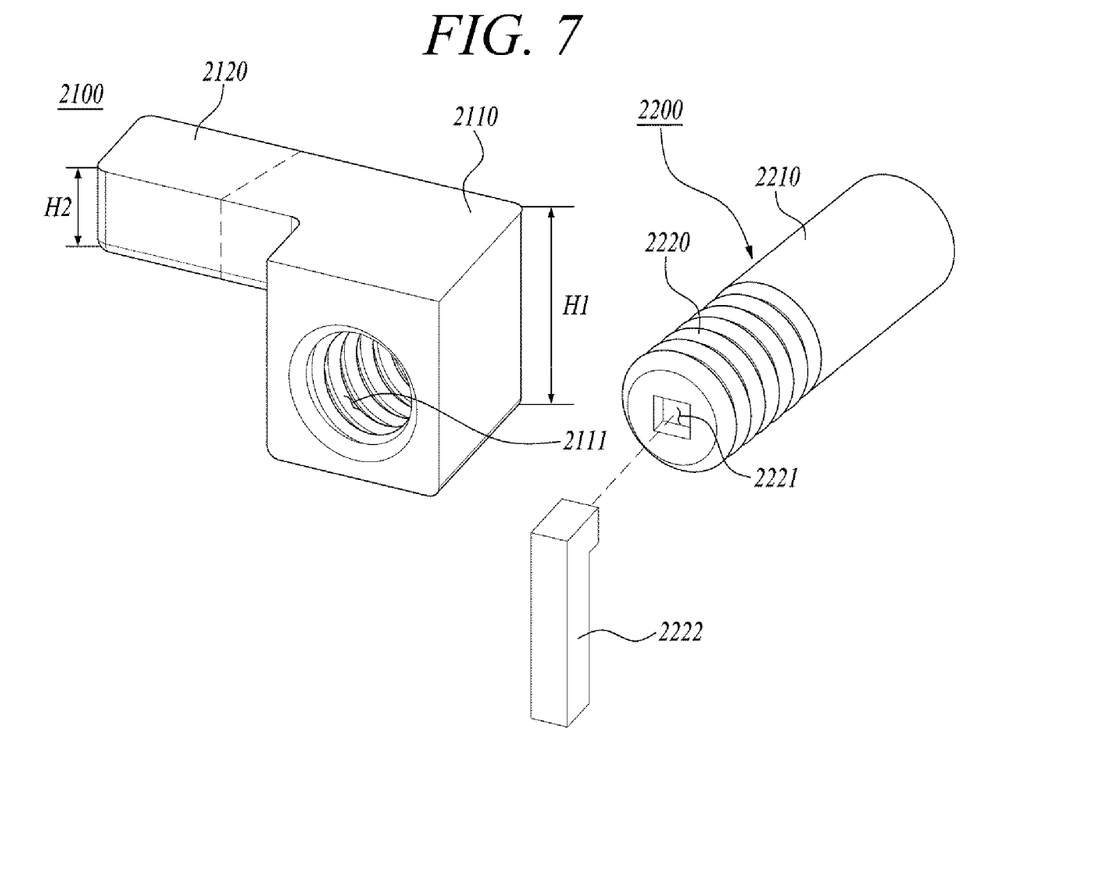
FIG. 7 is a perspective view illustrating the fastening key and the fastening pin constituting a blade fastening assembly according to an embodiment of the present disclosure.

FIG. 7 is a perspective view illustrating the fastening key and the fastening pin constituting a blade fastening assembly according to an embodiment of the present disclosure.

Referring to FIG. 7, the fastening key 2100 includes a body part 2110 and a wing part 2120.

The body part 2110 may be formed in a predetermined shape, such as a cuboidal shape having a first height H1 in the radial direction Y when it is assembled with the turbine rotor disk 1320 and the turbine blade 1310.

A threaded hole 2111 is formed through the body part 2110 along the axial direction X. The threaded hole 2111 is formed to be in communication with the pin groove 2003 when the body part 2110 is assembly with the turbine rotor disk 1320. A thread is formed on an inner wall of the threaded hole 2111. The body part 2110 may be inserted into the first groove 2001.

The wing part 2120 is formed to extend a predetermined length toward the platform 1312 from the body part 2110 in the circumferential direction Z. The wing part 2120 is formed to have a second height H2 that is smaller than the first height H1 in the radial direction Y when it is assembled with the turbine rotor disk 1320 and the turbine blade 1310. The wing part 2120 is formed to extend toward the platform 1312 from a side surface of the body part in the circumferential direction Z extending downward the second height H2 from an upper surface of the body part 2110. A width of the wing part 2120 in the circumferential direction Z is the same with the width of the second groove 2002 (i.e., the combined width of the first wing groove portion 2002a and the second wing groove portion 2002b) such that the wing part 2120 may be inserted into the second groove 2002.

Referring to FIG. 7, the fastening pin 2200 may be in the form of a cylinder extending a predetermined length, and the fastening pin 2200 may be inserted and secured in the threaded hole 2111 and the pin groove 2003. The fastening pin 2200 includes an insertion part 2210 and a threaded part 2220.

The outer circumferential surface of the insertion part 2210 is formed in a smooth shape, allowing the rearward end to be inserted into the pin groove 2003. The outer circumferential surface of the threaded part 2220 is threaded to engage with the threads of the threaded hole 2111 to allow the fastening pin 2200 to be securely fastened to the fastening key 2100. A fastening member (2221) may be formed on an forward end surface (externally exposed side) of the threaded part 2220 such that a separate fastener (2222) is inserted therethrough to rotate the fastening pin 2200. When the fastening pin 2200 is inserted, the fastener can be inserted into the fastening member to rotate the fastening pin 2200, so that the fastening pin 2200 can be firmly fastened in the threaded hole 2111 and the pin groove 2003 during rotation. The fastener and the fastening member may be used when disassembling the fastening pin 2200 from the threaded hole 2111 and the pin groove 2003.

Figure 8:
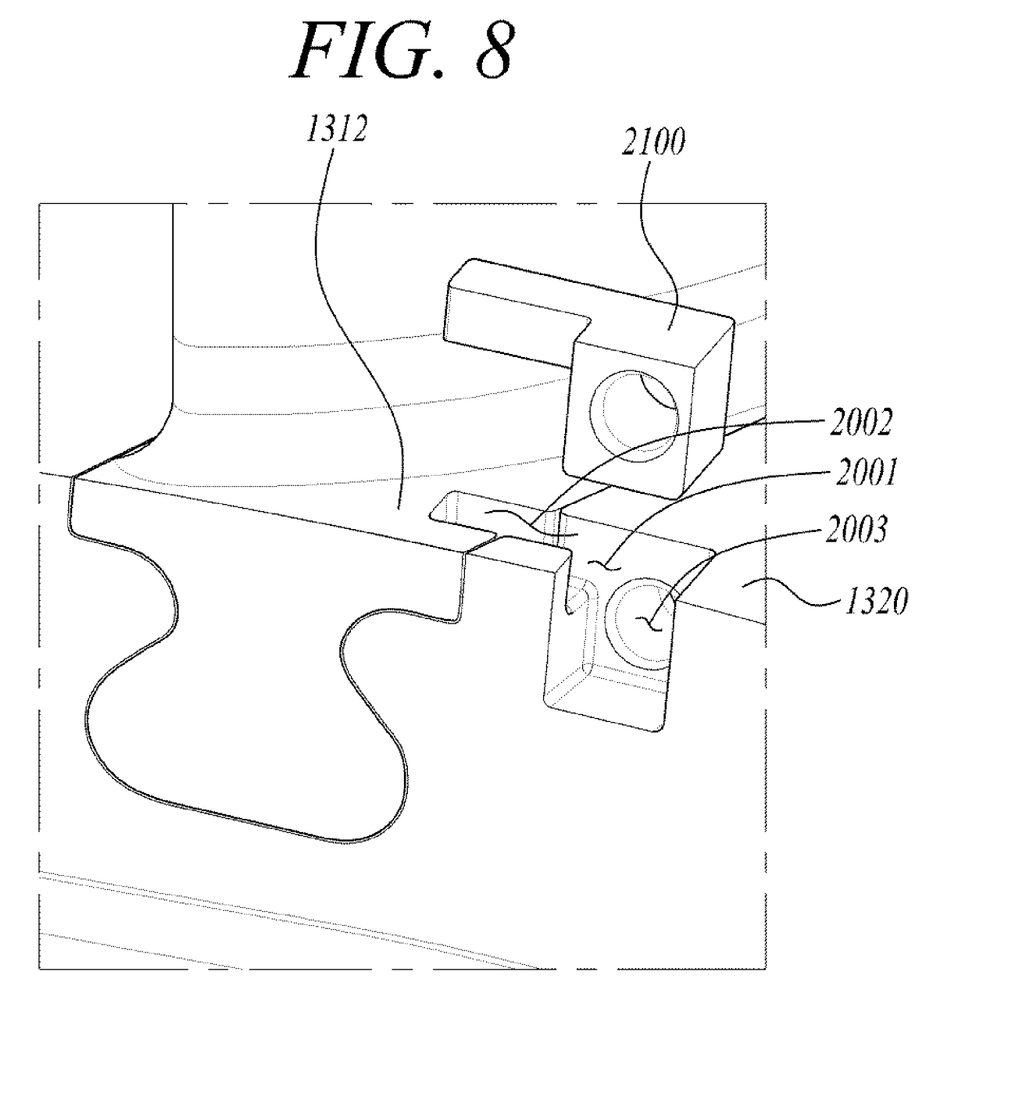
FIGS. 8 and 9 are views illustrating a process of installing a turbine blade on a turbine rotor disk using a blade fastening assembly according to an embodiment of the present disclosure.
Figure 9:
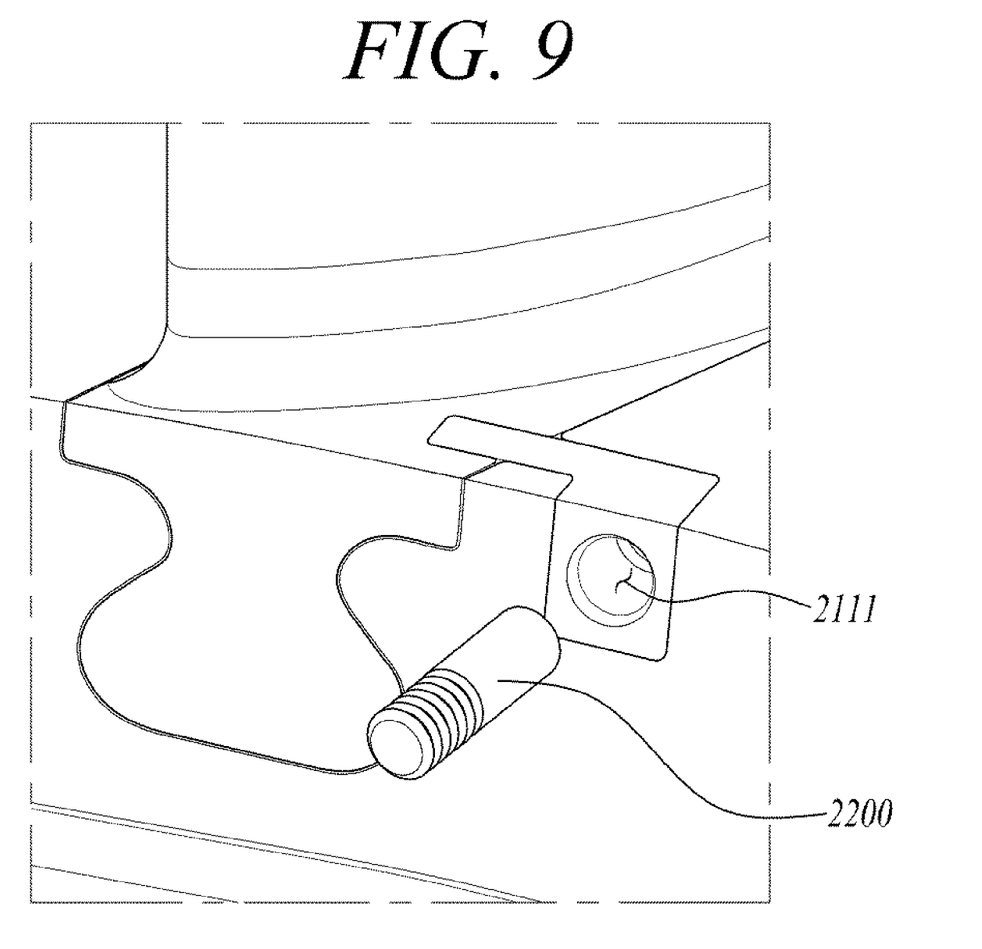

Next, a process of installing a turbine blade into a turbine disk slot will be described with reference to FIGS. 8 and 9. FIGS. 8 and 9 are views illustrating a process of installing a turbine blade on a turbine rotor disk using a blade fastening assembly according to an embodiment of the present disclosure. On the other hand, FIGS. 8 and 9 may be understood as illustrating a process of manufacturing and assembling a gas turbine according to an embodiment of the present disclosure.

First, as illustrated in FIG. 8, the first groove 2001 and the pin groove 2003 are formed in the turbine rotor disk 1320, and the second groove 2002 is formed adjacent to the first groove 2001 on the turbine rotor disk 1320 and on the platform 1312. Next, the fastening key 2100 is inserted into the first groove 2001 and the second groove 2002. At this time, the body part 2110 of the fastening key 2100 is inserted into the first groove 2001, and the wing part 2120 is inserted into the second groove 2002.

Next, as illustrated in FIG. 9, the fastening pin 2200 is inserted into the threaded hole 2111, and then rotated so that the fastening pin 2200 is firmly fastened in the threaded hole 2111 and the pin groove 2003.

In this way, by inserting the fastening key 2100 into the first groove 2001 and the second groove 2002 and the fastening pin 2200 into the threaded hole 2111, the installation of the blade on the rotor disk is structurally safe and improves installation workability. Furthermore, preventing the axial movement of the blade after installation to minimize wear resulting from friction between the blade and the rotor disk can enhance the overall durability of a gas turbine.

The blade fastening assembly 2000 according to an embodiment of the present disclosure can be usefully applied in cases where 1) the working space before and after the rotor disk is narrow, and 2) the shape of the fastening pin or key is limited due to the small size of the blade and rotor disk.

While the embodiments of the present disclosure have been described, it will be apparent to those skilled in the art that various modifications and variations can be made in the present disclosure through addition, change, omission, or substitution of components without departing from the spirit of the disclosure as set forth in the appended claims, and such modifications and changes may also be included within the scope of the present disclosure. Also, it is noted that any one feature of an embodiment of the present disclosure described in the specification may be applied to another embodiment of the present disclosure. Similarly, the present invention encompasses any embodiment that combines features of one embodiment and features of another embodiment.

The invention claimed is:

1. A blade fastening assembly comprising:
 a fastening key having a threaded hole;
 a rotor disk including a disk slot into which a root member is inserted, the rotor disk having a first groove with a shape corresponding to a portion of the fastening key, a first portion of a second groove adjacent to the first groove, and a pin groove connected with the first groove;
 a platform having a second portion of the second groove formed in communication with the first portion of the second groove and the first groove and forming a shape corresponding to a remaining portion of the fastening key in a state of being inserted into the disk slot; and
 a fastening pin inserted into the threaded hole and the pin groove.

2. The blade fastening assembly of claim 1, wherein the fastening key comprises:
 a body part in which the threaded hole is formed, and
 a wing part extending from the body part toward the platform.

3. The blade fastening assembly of claim 2, wherein the body part has a first height and the wing part has a second height smaller than the first height.

4. The blade fastening assembly of claim 3, wherein the wing part extends toward the platform from a side surface of the body part extending downwards the second height from an upper surface of the body part.

5. The blade fastening assembly of claim 4, wherein the wing part is inserted through both the first portion of the second groove and the second portion of the second groove.

6. The blade fastening assembly of claim 1,
 wherein the fastening pin is in a cylindrical shape, and
 wherein the fastening pin comprises:
 an insertion part having an end inserted into the pin groove, and
 a threaded part connected to the insertion part and threaded on an outer circumferential surface thereof.

7. The blade fastening assembly of claim 6, wherein a fastening member, into which a fastener is inserted to rotate the fastening pin, is located on an upper surface of the threaded part.

8. The blade fastening assembly of claim 1, wherein the pin groove extends axially rearwards from an inner surface of the first groove.

9. The blade fastening assembly of claim 1, wherein the first groove and the pin groove are formed by cutting a portion of an axially forward end of the rotor disk, and the second groove is formed by cutting a side portion of the platform and a portion of the rotor disk adjacent to the first groove.

10. The blade fastening assembly of claim 1, wherein the root member and the platform are formed on a turbine blade or a compressor blade.

11. A gas turbine comprising:
 a compressor configured to compress air;
 a combustor configured to mix the compressed air from the compressor with fuel and combust a compressed air-fuel mixture;
 a turbine section rotated by combustion gases from the combustor to generate power; and a blade fastening assembly formed in at least one of the compressor and the turbine section to fasten an axial position of a blade and prevent the axial movement of the blade, the blade fastening assembly comprising:
a fastening key having a threaded hole;
a rotor disk including a disk slot into which a root member is inserted, the rotor disk having a first groove with a shape corresponding to a portion of the fastening key, a first portion of a second groove adjacent to the first groove, and a pin groove connected with the first groove;
a platform having a second portion of the second groove formed in communication with the first portion of the second groove and the first groove and forming a shape corresponding to a remaining portion of the fastening key in a state of being inserted into the disk slot; and
a fastening pin inserted into the threaded hole and the pin groove.

12. The gas turbine of claim 11, wherein the fastening key comprises:
a body part in which the threaded hole is formed, and
a wing part extending from the body part toward the platform.

13. The gas turbine of claim 12, wherein the body part has a first height and the wing part has a second height smaller than the first height.

14. The gas turbine of claim 13, wherein the wing part extends toward the platform from a side surface of the body part extending downwards the second height from an upper surface of the body part.

15. The gas turbine of claim 14, wherein the wing part is inserted through both the first portion of the second groove and the second portion of the second groove.

16. The gas turbine of claim 11,
wherein the fastening pin is in a cylindrical shape, and
wherein the fastening pin comprises:
an insertion part having an end inserted into the pin groove, and
a threaded part connected to the insertion part and threaded on an outer circumferential surface thereof.

17. The gas turbine of claim 16, wherein a fastening member, into which a fastener is inserted to rotate the fastening pin, is located on an upper surface of the threaded part.

18. The gas turbine of claim 11, wherein the pin groove extends axially rearwards from an inner surface of the first groove.

19. The gas turbine of claim 11, wherein the first groove and the pin groove are formed by cutting a portion of an axially forward end of the rotor disk, and the second groove is formed by cutting a side portion of the platform and a portion of the rotor disk adjacent to the first groove.

20. The gas turbine of claim 11, wherein the root member and the platform are formed on a turbine blade or a compressor blade.

* * * * *